UNITED STATES PATENT OFFICE.

GEORGE DAVISON, OF STONINGTON, CONNECTICUT.

DRIVING-BELT.

1,223,769.  Specification of Letters Patent.  Patented Apr. 24, 1917.

No Drawing.  Application filed September 22, 1915. Serial No. 52,111.

*To all whom it may concern:*

Be it known that I, GEORGE DAVISON, a citizen of the United States, and a resident of Stonington, in the county of New London and State of Connecticut, have invented certain new and useful Improvements in or Relating to Driving-Belts, of which the following is a specification.

The invention pertains more particularly to a driving belt for machinery or the like and to be used as a substitute for the customary leather belts in general use. My invention has several purposes in view, one being to provide a highly efficient belt preferably in one integral piece and of a material which is less expensive than leather, and another being to provide a belt which will more tenaciously keep its place on the pulley-wheels when under strains than leather belts. A further purpose of the invention is to utilize in the manufacture of driving belts a material which has not heretofore been used for such purpose and which possesses characteristics which I have discovered admirably adapt it when treated in the manner hereinafter described for driving belts. A still further purpose of the invention is to provide means whereby the material for driving belts may be made in any desired width and cut into strips of suitable widths for the individual belts, leaving each belt in one integral piece and avoiding in the construction of the belt the splicing and riveting commonly employed in the manufacture of leather belts.

In carrying out my invention I make use of felt as the body material of the belt and I subject the felt to a treatment which imparts to it the conditions requisite for a highly efficient, durable and desirable driving belt. I make the felt in the ordinary way and in a width and length suitable for my purpose. In making the felt I proceed with the fulling according to known processes, but in this instance employ a greater proportion of flax or equivalent substance designed to impart the requisite tensile strength to the felt, and after the felt has been made it is bodily treated, in the manner hereinafter described, so as to render it entirely suitable for use in the manufacture of driving belts.

The treatment to which I subject the felt is preferably carried on in two separate stages and two separate sets of ingredients, each set being of liquid nature so as to permeate the felt, and the felt being subjected to the action of the materials hereinafter described in vats holding a sufficient quantity to thoroughly permeate the felt while the latter is caused to travel within the same.

The material used by me in the first treatment or stage of treatment of the felt is preferably composed of the following ingredients in about the proportions stated, to-wit:

White sugar of lead, 1 per cent.
Pigment, 29 per cent.
Boiled oil, 55 per cent.
Gasolene, 15 per cent.

In preparing the compound from the ingredients just above-mentioned, the white sugar of lead, pigment and boiled oil are thoroughly ground together and I then mix in the gasolene, the whole being put into a mechanical mixer and thoroughly mixed together. The compound thus formed is placed in a vat or receptacle of suitable size and the felt is caused to travel within the vat or receptacle until the mixture thoroughly permeates the same. I regard the mixture above described as a filler which helps fill the pores between the fibers of the felt and adds strength and wearing quality to the fibers. The gasolene may of course be replaced by naphtha or equivalent substance, and the gasolene helps to send the oil and other ingredients into the felt as a filler. The gasolene or naphtha will dry quickly and pass off leaving the other ingredients mentioned, or the mixture thereof, within the pores of the felt. The white sugar of lead is employed as a mild drier for the oil and the pigment as a filler and to increase the wearing qualities of the surface of the belt. The boiled oil waterproofs the fibers of the fabric and consequently the belt as a whole and serves to keep the same soft, this function being rendered permanent by the second stage of the treatment to which I subject the felt.

After the felt has been subjected to the first treatment or stage of treatment, it is removed from the vat or receptacle and allowed to substantially dry, and the felt is then subjected to the second treatment or stage of treatment in a vat or receptacle containing the following ingredients, to wit:

Resin, 15 per cent.
Paraffin wax, 85 per cent.

The resin and wax are melted together, and while the solution thus formed is still hot and kept hot, the felt is caused to travel within and through the same until the materials have permeated the felt, after which the felt is removed from the vat or receptacle and allowed to dry and is then ready to be cut into suitable widths for the driving belts to be produced therefrom.

The last treatment or stage of treatment of the felt I regard as important in that the wax and resin fill all the interstices left between the fibers and render the felt firm, strong and durable. The wax is important in that it covers over the fibers which have been oiled in the first stage of the treatment and acts as a shield to prevent the oil from oxidizing, and in this way the wax combined with the oil keeps the belt flexible and preserves it from becoming hard and brittle. The resin does not permeate the felt to the same extent that the oil does and consequently remains within the outer portions of the thickness of the felt and upon the surface of the felt and all this serves to coöperate with the wax in excluding from the belt the air which might otherwise oxidize the oil and render the belt brittle and hard. The resin also gives an adhesiveness to the belt, which causes it to properly hug the pulley wheels. The felt is rendered waterproof by the treatment it receives, and hence the belts made therefrom will be waterproof.

I make use of the word felt in the commercial sense, meaning thereby felt produced by fulling wool fibers. In this instance however I incorporate in the fibers a suitable proportion of flax or other fiber serving to afford in the finished product the requisite tensile strength for the driving belt purposes. The flax is incorporated in the wool fibers during the fulling process, and hence becomes incorporated in the material of which the felt is formed. The quantity of flax fibers incorporated in the wool fibers will depend largely upon the size of belt to be produced and the character of the work expected of it. A belt for driving heavy machinery would require a larger proportion of flax fiber than a small belt for driving a small tool, such as a small lathe or some analogous machine. I am not therefore able to give exact proportions of the flax fibers to be made use of, but will put in a sufficient quantity of fiber to impart the required tensile strength in the finished product.

The belt of my invention is not merely a strip of felt but is made from felt and other substances carried thereby and taken up by the felt during the treatment of the same hereinbefore described.

I do not limit my invention to the employment of all of the materials hereinbefore described, nor to the proportions stated, since these proportions may vary and equivalent substances may be used for those specifically mentioned. The more essential ingredients employed are the boiled oil, wax and resin, but for obtaining the best results I prefer to make use of the other ingredients named.

What I claim as my invention and desire to secure by Letters-Patent, is:

1. A driving belt formed of felt comprising a body of fulled wool fibers having incorporated therein during the fulling process an adequate quantity of fibers of greater tensile strength than that possessed by the wool fibers, thereby to impart to the belt the requisite tensile strength for belt purposes, and the fibers of which felt have an oil and a wax coating rendering, substantially, the felt waterproof and the oil non-oxidizable.

2. A driving belt formed of felt comprising a body of fulled wool fibers having incorporated therein during the fulling process an adequate quantity of fibers of greater tensile strength than that possessed by the wool fibers, thereby to impart to the belt the requisite tensile strength for belt purposes, and the fibers of said body having an oil coating and a coating exterior thereto formed of wax and resin.

3. A driving belt formed of felt having incorporated therein an oil coating on the fibers and exterior to said coating a coating of wax and resin.

4. A driving belt formed of felt having incorporated therein a filler of oil and pigment and a further filler of wax and resin.

Signed at Stonington, in the county of New London and State of Connecticut, this 20th day of September, A. D. 1915.

GEORGE DAVISON.

Witnesses:
ALBIT KUEHN,
ALBERT G. MARTIN.

Copies of this patent may be obtained for five cents each, by addressing the "Commissioner of Patents, Washington, D. C."